United States Patent
Bruckhaus (10) Patent No.: US 8,844,031 B1
(45) Date of Patent: Sep. 23, 2014

(54) DETECTING SPAM EVENTS IN EVENT MANAGEMENT SYSTEMS

(75) Inventor: Tilmann Bruckhaus, Cupertino, CA (US)

(73) Assignee: Eventbrite, Inc., San Francisco, CA (US)

(\*) Notice: Subject to any disclaimer, the term of this patent is extended or adjusted under 35 U.S.C. 154(b) by 569 days.

(21) Appl. No.: 12/982,264

(22) Filed: Dec. 30, 2010

(51) Int. Cl.
*G06F 21/00* (2013.01)

(52) U.S. Cl.
USPC .......................................... 726/22; 709/204

(58) Field of Classification Search
None
See application file for complete search history.

(56) References Cited

U.S. PATENT DOCUMENTS

| | | |
|---|---|---|
| 7,403,922 B1 | 7/2008 | Lewis et al. |
| 7,527,195 B2 | 5/2009 | Keithley et al. |
| 7,610,216 B1 | 10/2009 | May et al. |
| 7,657,497 B2 | 2/2010 | Nandy |
| 8,019,689 B1 * | 9/2011 | Nachenberg ........... 705/64 |
| 2005/0108569 A1 * | 5/2005 | Bantz et al. ........... 713/201 |
| 2007/0129999 A1 | 6/2007 | Zhou et al. |
| 2008/0005341 A1 * | 1/2008 | Subbian ........... 709/229 |
| 2008/0098313 A1 | 4/2008 | Pollack ........... 715/753 |
| 2008/0256210 A1 * | 10/2008 | Malik ........... 709/206 |
| 2009/0094175 A1 * | 4/2009 | Provos et al. ........... 706/12 |
| 2009/0192853 A1 * | 7/2009 | Drake et al. ........... 705/7 |
| 2010/0094791 A1 | 4/2010 | Miltonberger |
| 2010/0287368 A1 * | 11/2010 | Shuster et al. ........... 713/150 |
| 2010/0293090 A1 | 11/2010 | Domenikos et al. |
| 2011/0145435 A1 * | 6/2011 | Bhatawdekar et al. ........ 709/238 |
| 2011/0294478 A1 * | 12/2011 | Trivi et al. ........... 455/415 |
| 2012/0124664 A1 * | 5/2012 | Stein et al. ........... 726/22 |
| 2012/0197749 A1 | 8/2012 | Gray |
| 2012/0203698 A1 | 8/2012 | Duncan et al. |

\* cited by examiner

*Primary Examiner* — Nadia Khoshnoodi
*Assistant Examiner* — Adrian Stoica
(74) *Attorney, Agent, or Firm* — Baker Botts L.L.P.

(57) ABSTRACT

In one embodiment, a method includes accessing event information and payment information associated with an event listing on an event management system, and calculating a spam risk score for the event listing.

20 Claims, 6 Drawing Sheets

DETECTING SPAM EVENTS IN EVENT MANAGEMENT SYSTEMS

TECHNICAL FIELD

The present disclosure generally relates to online event management systems and spam detection systems.

BACKGROUND

Many websites allow users to conduct a variety of actions online, such as viewing content, writing reviews, ordering items, purchasing tickets, etc. These websites often present the user with a plurality of actions to choose from and allow the user to select the type of action he would like to perform. Once the action is selected, the website typically redirects the client system of the user to a webpage where the action can be completed. For example, some websites allow users to organize events using an online event management system. An online event management system may allow an event organizer to organize and manage various aspects of an event, such as, for example, managing attendee registrations and selling tickets, promoting the event, and managing attendee check-in at the event. An online event management system may also allow users to view event listings, register for events, and purchase tickets for events. Online systems, such as online event management systems, can typically be accessed using suitable browser clients (e.g., Firefox, Chrome, Internet Explorer).

Some users of an online event management system may attempt to improperly use the system, such as by violating the terms of services of the system or by using the system to commit illegal or improper acts. One type of improper use is creating event listings that contain spam or other improper advertisements. For example, a user may create an online event listing for a fake event and then use the event listing to display an advertisement for a product (e.g., erectile dysfunction drugs, nutraceuticals, pornography). Another type of improper use is creating event listings that include a large number of links to other sites in an attempt to boost rankings at search engines.

BRIEF DESCRIPTION OF THE DRAWINGS

FIGS. 5A and 5b illustrate example user interfaces.

DESCRIPTION OF EXAMPLE EMBODIMENTS

System Overview

Figure 1:
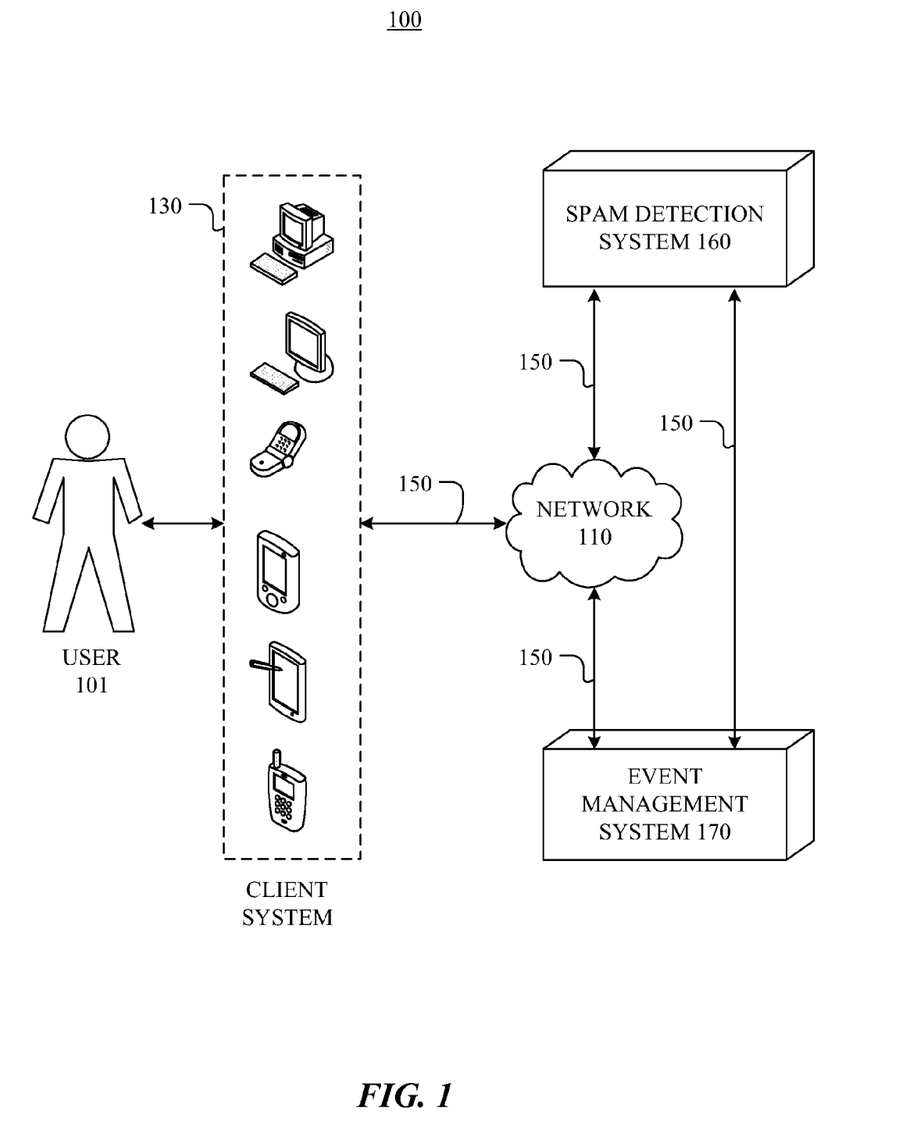
FIG. 1 illustrates an example system for implementing an online event management system and an online spam detection system.

FIG. 1 illustrates an example system 100 for implementing an online event management system and a spam detection system. System 100 includes a user 101, a client system 130, a spam detection system 160, and an event management system 170 connected to each other by a network 110. Although FIG. 1 illustrates a particular arrangement of user 101, client system 130, spam detection system 160, event management system 170, and network 110, this disclosure contemplates any suitable arrangement of user 101, client system 130, spam detection system 160, event management system 170, and network 110. As an example and not by way of limitation, two or more of client system 130, spam detection system 160, and event management system 170 may be connected to each other directly, bypassing network 110. As another example and not by way of limitation, two or more of client system 130, spam detection system 160, and event management system 170 may be physically or logically co-located with each other in whole or in part. As yet another example, one or more spam detection systems 160 may be physically or logically co-located with one or more event management systems 170 in whole or in part. Moreover, although FIG. 1 illustrates a particular number of users 101, client system 130, spam detection systems 160, event management systems 170, and networks 110, this disclosure contemplates any suitable number of users 101, client systems 130, spam detection systems 160, event management systems 170, and networks 110. As an example and not by way of limitation, system 100 may include multiple users 101, client systems 130, spam detection systems 160, event management systems 170, and networks 110.

In particular embodiments, an event management system 170 may be a network-addressable computing system that can host one or more event organization and management systems. An event management system 170 may generate, store, receive, and transmit event-related data, such as, for example, event listings, event details, event history details, event registration details, event organizer details, event attendee details, ticket purchase details, and event displays. An event management system 170 may be accessed by the other components of system 100 either directly or via network 110. In particular embodiments, spam detection system 160 may be a network-addressable computing system that can host one or more event spam detection engines. Spam detection system 160 may generate, store, receive, and transmit event spam-related information, such as, for example, event-related data, event organizer information, and spam risk scores. Spam detection system 160 may be accessed by the other components of system 100 either directly or via network 110. Spam detection system 160 may be an independent system or a subsystem of event management system 170.

In particular embodiments, one or more users 101 may use one or more client systems 130 to access, send data to, and receive data from an event management system 170. A client system 130 may access an event management system 170 directly, via network 110, or via a third-party system. A client system 130 may be any suitable computing device, such as, for example, a personal computer, a laptop, a cellular phone, a smart phone, or a computing tablet. In particular embodiments, one or more users 101 may be an automated system, such as, for example, a computer program, an internet bot, a computer virus, malware, another type of automated system, or two or more such systems.

Network 110 may be any suitable communications network. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Connections 150 may connect client system 130, spam detection system 160, and event management system 170 to communication network 110 or to each other. This disclosure contemplates any suitable connections 150. In particular embodiments, one or more connections 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 150 each include an ad hoc network, an intranet, an extranet, a VPN, a LAN, a WLAN, a WAN, a WWAN, a MAN, a portion of the Internet, a portion of the PSTN, a cellular telephone network, another connection 150, or a combination of two or more such connections 150. Connections 150 need not necessarily be the same throughout system 100. One or more first connections 150 may differ in one or more respects from one or more second connections 150.

Event Management Systems

In particular embodiments, an event management system 170 may allow users to create, organize and manage events. An event may be, for example, a party, a concert, a conference, a sporting event, a fundraiser, a networking event, or a live performance. Events may occur online (such as, for example, a web-based seminar) and offline (such as, for example, a live seminar in a lecture hall). An online event management system may allow an event organizer to organize and manage various aspects of an event, such as, for example, managing attendee registrations and selling tickets, managing funds from ticket sales, promoting the event, and managing attendee check-in at the event. An online event management system may also allow event attendees to view and manage various aspects of registering for an event, such as, for example, viewing event listings, viewing event information, viewing event history information, registering for events, and purchasing tickets for events. As an example and not by way of limitation, a first user may use event management system 170 to create and organize an event. The first user may input event information associated with the event. This information may be viewable in one or more web pages or other content served by event management system 170. One or more second users may then use event management system 170 to register for the event. The second users may view an event listing associated with the event and then purchase tickets for the event. Although this disclosure describes particular types of events, this disclosure contemplates any suitable types of events. Moreover, although this disclosure describes organizing and managing particular aspects of an event, this disclosure contemplates organizing and managing any suitable aspects of an event.

In particular embodiments, each event that event management system 170 is managing has an associated event listing. An event listing may be accessed and displayed by any suitable client system 130. An event listing may have an event information associated with the event listing. Event information may include information describing the event date, type, cost, organizer, promoter, geographic location, venue, performer, attendees, types of classes of tickets available, and other suitable event information. Other information can include hypertext links to resources related to or describing the event, and the like. Although this disclosure describes particular types of event information, this disclosure contemplates any suitable types of event information. An event listing may also have a payment information associated with the event listing. Payment information may include the address verification system code for the payments for the event, the credit cards used to pay for the event, the decline rate for the credit cards, the use ratio of the credit cards, the locations of payers, the IP addresses of the payers, the use ratio of the IP addresses, the number of prior payouts to the event organizer, the amount of prior payouts to the event organizer, and other suitable payment information. Although this disclosure describes particular types of payment information, this disclosure contemplates any suitable types of payment information.

In particular embodiments, each user 101 of event management system 170 may have an event history information associated with the user 101. Event history information may include event information and payment information associated with one or more events a user 101 has attended or has registered to attend, as well as purchase history information associated with the event. Event history information may also include event information and payment information associated with one or more event listings a user 101 has created, organized, and managed. Although this disclosure describes particular event history information, this disclosure contemplates any suitable event history information.

In particular embodiments, the event management system 170 may use unique client identifiers to identify a user 101. As an example and not by way of limitation, the event management system 170 may assign a unique client identifier to each client system 130. The event management system 170 may assign each client system 130 with an unique client identifier based on the IP address of the client system 130, tracking cookies on the client system 130 (which may be appended to HTTP requests transmitted by the client system 130), the serial number or asset tag of the client system 130, or other suitable identifying information. For example, in one implementation, a script implemented in a page downloaded to the client system may access various attributes of the client system 130 to determine a hardware-based signature that can be used to uniquely identify client system 130.

In addition, event management system 170 may maintain an account for each user. An account may be of one or at least two types, such as a consumer (event attendee) account and an event organizer account. The event management system 170 may assign a unique client identifier to each user 101, which the user must provide to the event management system 170 via a client system 130. The event management system 170 may maintain for each user 101 a username and password that the user 101 can input into client system 130, which then transmits the username and password to the event management system 170. In particular embodiments, the event management system 170 can use the unique client identifier to determine that the user 101 is accessing the system.

In particular embodiments, the event management system 170 may maintain an event management account for a user 101. The event management account may contain a variety of information about the user 101. As an example and not by way of limitation, an event management account may contain personal information (such as, for example, name, sex, location, and interests), social network information (such as, for example, friend connections), financial information (such as, for example, income and credit history), event history information (such as, for example, the type, data, cost, venue, performers, and geographic location of the events a user 101 has organized, registered for, or attended), and other suitable information related to the user 101. The event management account may also contain information related to the event listings created by the user, the orders received for tickets to various events, funds collected by event management system 170 from ticket sales for event listings created by the user 101, and information related to funds paid out to the user 101. Although this disclosure describes event management accounts containing particular types of information about a user 101, this disclosure contemplates event management accounts containing any suitable information about a user 101.

Spam Detection Systems

In particular embodiments, a spam detection system 160 may evaluate one or more event listings for potential or actual spam. Spam detection system 160 may be an independent system or a subsystem of event management system 170. Spam detection system 160 may access event listings and associated event information and event organizer account information on event management system 170 and analyze the event listings for improper, fraudulent, or illegal use. Although this disclosure describes particular methods for evaluating event listings for spam, this disclosure contemplates any suitable methods for evaluating event listings for spam.

In particular embodiments, an event listing may be evaluated for spam by calculating a spam risk score for the event listing. A spam risk score may represent the probability an event listing is spam, the percentile rank of the risk of spam associated with the event listing in relation to other event listings, or other suitable scoring representations. As an example and not by way of limitation, spam detection system 160 may analyze a set of event listings for spam and calculate a preliminary spam value associated with the risk of spam for each event listing. Spam detection system 160 may then sort the event listings by preliminary spam value and calculate a percentile rank associate with each event listing or preliminary spam value. The percentile ranks may then be used as the spam risk scores for the event listings. As another example and not by way of limitation, spam detection system 160 may analyze a set of event listings and determine the mean or nominal values for particular types of event information. Spam detection system 160 may then calculate the deviation of each event listing from these mean or nominal values, such that event listings with more or larger deviations may have higher spam risk scores than event listings with fewer or smaller deviations. For example, if the nominal value for an event location is "United States," then event listings with event locations of "Nigeria" may have high spam risk scores than event listings with event locations of "United States." As another example, if the mean number of hypertext links included in an event listing is 4 with a standard deviation of ±2, then an event listing with 30 hypertext links may have a high spam risk score. Although this disclosure describes using particular methods for scoring the risk of spam associated with an event listing, this disclosure contemplates using any suitable methods for scoring the risk of spam associated with an event listing.

Spam detection system 160 may calculate a spam risk score for an event listing based on a variety of factors, such as, for example, event information associated with the event listings, event organizer account history information associated with event organizer associated with the listing, other event organizer accounts that are related to or associated with the account of the event listing, other suitable event or payment information, or two or more such factors. The following is an example algorithm that spam detection system 160 could use to calculate a spam risk score:

$$f_{spam}=f(E_1,\ldots,E_n,P_1,\ldots,P_m)$$

where:
$f_{spam}$ is the spam risk score,
$E_1,\ldots,E_n$ are event information 1 through n, and
$P_1,\ldots,P_m$ are event organizer account information 1 through m.

Although this disclosure describes calculating a spam risk score using a multi-factor algorithm, this disclosure contemplates calculating a spam risk score using any suitable algorithm. Moreover, although this disclosure describes calculating a spam risk score using particular variables that represent particular information, this disclosure contemplates calculating a spam risk score using any suitable variables representing any suitable information. Further description of an example spam detection model is provided below.

In particular embodiments, spam detection system 160 may evaluate an event listing for spam at particular times. Spam detection may be in real-time or post-facto. As an example and not by way of limitation, spam detection system 160 may evaluate an event listing for spam when the event listing is created by an event organizer. As yet another example and not by way of limitation, spam detection system 160 may evaluate an event listing for spam periodically, such as once an hour, once a day, or another suitable period. As yet another example and not by way of limitation, spam detection system 160 may evaluate an event listing for spam whenever any information associated with the event listing changes (such as new ticket orders being added, changes to the event description being made, or any other such changes occurring). Although this disclosure describes evaluation of event listings at particular times, this disclosure contemplates evaluation of event listings at any suitable times. In particular embodiments, spam detection system may evaluate a set of event listings for spam in particular orders. Spam detection system 160 may evaluate one or more event listings individually, in batches, in whole, or by other suitable process groupings.

In particular embodiments, spam detection system 160 may evaluate an event listing for spam based on the event information associated with the event listing. Event information may include, or be directed to, the nature and amount of configuration the event organizer has performed to create the event listing, include the number and types of different tickets (as opposed to only one or a default ticket type), text information describing the event, the number and sizes of images posted to the event listing, the event type, cost, organizer, promoter, geographic location, venue, performer, and other suitable event information. Event information may also include activity observed by the event management system 170 related to the event, such as the number of page views for the event and the number of ticket purchases. For example, a large number of page views in comparison to no or relatively few ticket sales may indicate a spam event listing, as users when encountering the event listing page recognize it as spam and do not purchase a ticket. Event information may also include information describing the event organizer, such as, for example, the event organizer's name, email, contact information, location, IP address, reputation, financial information, credit score, bank account number, payment history, and other suitable information about the event organizer. In particular embodiments, spam detection system 160 may evaluate an event listing for spam based on the location of the event. Event organizer information may also include the total number of events, and/or the creation rate at which events, associated with event organizer, are configured and entered into event management system 170. IP addresses in particular locations or countries may be more likely to be associated with spam than events in other locations or countries. The location of an IP address associated with the event organizer may be determined by event management system 170 by accessing one or more packets transmitted by a client system 130 associated with an event organizer. As an example and not by way of limitation, IP addresses located in the United States or the European Union may present lower spam risk than IP addresses located in various African nations or former Eastern Bloc countries that are known to present higher spam risk. The location of an event organizer may be determined by querying the event organizer account information, from the event organizer's financial or personal information, by examining the IP address of the event organizer when he accesses event management system 170, or by other suitable methods. As an example and not by way of limitation, an event listing with an event organizer from Romania may have a higher spam risk score than an event listing with an event organizer from the United States. In particular embodiments, spam detection system 160 may evaluate an event listing for spam based on the reputation of the event organizer. Event organizers who have previously created non-spam-related event listings may be less likely to create spam event listings in the future. Similarly, event organizers who have previously created spam event listings may be more likely to create spam event listings. Furthermore, new users 101 of event management system 170 may be more likely to create spam event listings than users 101 with a history of using the system. As an example and not by way of limitation, an event listing with an event organizer who has a history of creating non-spam-related event listings may have a lower spam risk score than an event listing with an event organizer who has no history of creating event listings.

In one implementation, the spam detection system 160 considers the actions associated with a given remote host (identified by IP address or some other identifier, as discussed above) or set of remote hosts associated with one or more event organizer accounts under analysis. In particular implementations, the spam detection system 160 accesses a data log to identify the existence of a pattern of behavior associated with the same remote host or group of related hosts. In one implementation, the pattern involves the creation of event organizer accounts and subsequent event listings associated with that account. It has been observed that some spammers attempt to mask their efforts by creating multiple event organizer accounts and using each organizer account to create relatively fewer event listings. Indeed, a given spammer may create multiple accounts and event listings in a given period, such as an hour, day or month. In one implementation, event management system 170 maintains an account creation time field that stores a time stamp value corresponding to the point in time when an account is created. Event management system 170, in one implementation, may also store identifiers (such as IP addresses, hardware signatures, etc.) associated with each remote host that is used to access a corresponding event organizer account. Similarly, event management system 170 also maintains event listing creation times for all created event listings. In a particular implementation, spam detection system 160 accesses a data store of event management activity against a host identifier to identify the number of instances where an account creation-event listing creation pair is observed for the remote host over one or more time intervals, such as the last hour, twelve hours, day or month before the current time of analysis, or before the time of creation of the event being analyzed for spam risk. In one implementation, this analysis is performed for a single remote host. In other implementations, the process analyzes account creation and event listings across all remote hosts that have been used to access the event organizer account directly associated with a given event listing under analysis. In one implementation the spam detection system 160 identifies patterns that consider both the age of the user's account and the rate of event creation, so that a new user who creates a large number of events may be considered as more risky than an established user who creates the same number of events.

In one implementation, spam detection system 160 can implement a spam detection model that considers one or more of the foregoing factors. For example, in one implementation, a data set that includes data based on selected factors can be used as a training model for a regression-based algorithm to develop a spam detection model that receives one or more attributes as inputs and outputs a spam risk score. In one implementation, the M5P algorithm can be used to construct a spam scoring model. M5P combines a decision tree with the possibility of linear regression functions at the leaf nodes of the tree. Generally speaking, a decision-tree induction algorithm is used to build a tree, but instead of maximizing the information gain at each inner node, a splitting criterion is used that minimizes the intra-subset variation in the class values down each branch. The splitting procedure in M5P stops if the class values of all instances that reach a node vary very slightly, or only a few instances remain. The tree may be pruned back from each leaf node. When pruning, an inner node is turned into a leaf with a regression plane. To avoid sharp discontinuities between the sub-trees a smoothing procedure may be applied that combines the leaf model prediction with each node along the path back to the root, smoothing it at each of these nodes by combining it with the value predicted by the linear model for that node.

In one implementation, the training set for the spam detection model includes the following factors: 1) the number of links on the event listing page, 2) the event creation rate associated with the instant event organizer account; 3) the number of event organizer accounts associated with the same host; 4) the account-event creation pair velocity pattern (see above) associated with the remote host; and 5) the country corresponding to the IP address of the remote host from which a user access the event organizer account. In one implementation, the account-event creation pair velocity factor can be separated into sub-factors based on the length of the analysis window (if more than one time window (e.g., last day, week, month, etc.) is used). In some implementations, the spam detection model is built such that each of the factors discussed above include thresholds that may vary depending on the values of factor combinations. When a threshold is crossed for a given factor, the risk score, in one embodiment, increases. In some implementations, the value of one factor (such as country of IP address) may cause the thresholds for other factors (such as event creation rate) to vary. For example, the model may be less tolerant of a high event creation rate from an Eastern Bloc country than from accounts associated with the United States. In implementations that use M5P to construct a spam scoring model, the attributes of a given event listing may be used to initially find a leaf node of the model, where a regression model may consider one or more of the factors to compute a spam risk score.

Figure 2:
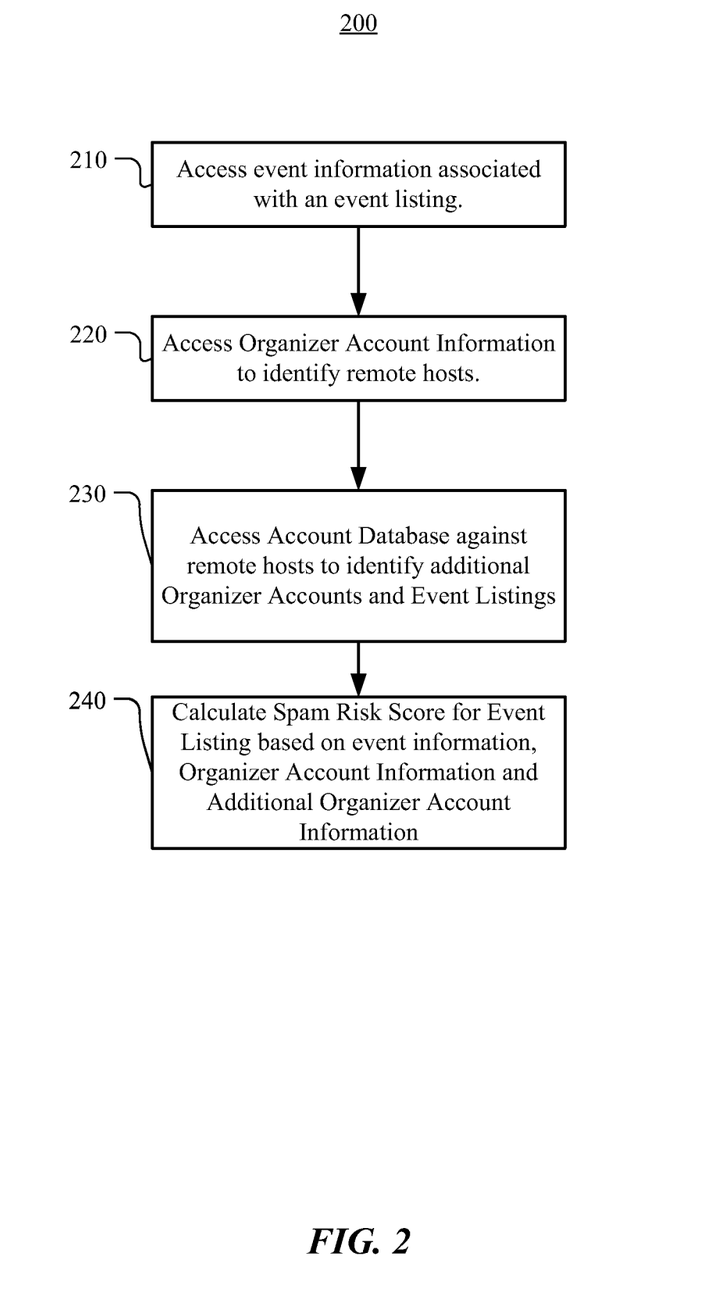
FIG. 2 illustrates an example method for evaluating event listings for spam.

FIG. 2 illustrates a process flow for determining a spam risk score for an event listing. As FIG. 2 illustrates, the spam detection system 160 accesses event information associated with an event listing (210), such as the number of links, and the like. The spam detection system 160 also accesses information associated with the event organizer account associated with the event listing (220), such as the number of other events associated with the account, an account creation rate, a country of the account, remote host identifiers associated with the account and the like. Spam detection system 160 may then, using the remote host identifiers found in step 220, access an account data base using the remote host information (230) to identify other event organizer accounts associated with the identified remote hosts in order, for example, to gather metrics on account creation, event creation and patterns related to the foregoing (as discussed above). For example, the spam detection system 160 may compute the number of additional event organizer accounts associated with the same remote hosts. The spam detection system 160 may also compute the number of observed account-event creation pairs associated with the remote host over the last hour, day and/or month. Spam detection system 160 then uses the data attributes gathered above as inputs to a spam risk scoring model to generate a score (240). The foregoing process flow can be iteratively applied over a desired number of event listings on a batch, on-demand or periodic basis. In some implementations, for example, an event listing may be evaluated on a daily basis as attributes associated with the event, the event organizer account and/or the remote hosts associated with the event organizer account change. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components carrying out particular steps of the method of FIG. 2, this disclosure contemplates any suitable combination of any suitable components carrying out any suitable steps of the method of FIG. 2.

In one implementation, spam detection system 160 may also implement other spam detection models in addition to the foregoing model. For example, spam detection model 160 may also input the number of hypertext links contained in the event listing to separate spam scoring model that considers this attribute alone or in combination with the country of IP address to determine a separate score. The function that considers the number of links may be a sigmoid function that returns a score between 0 and 1 based on the number of hypertext links in the page. In one implementation, there may be different sigmoid functions for different countries that are associated with the event listing. Spam detection system 160 may normalize the two scores and select the greater of the two scores for purposes of assigning a final score to a given event listing.

In particular embodiments, spam detection system 160 may perform a variety of actions to counter improper activities once an event listing has been found to be spam. As an example and not by way of limitation, spam detection system 160 may deactivate the event management account (and corresponding event listings) associated with the event organizer who created a spam event listing. As another example and not by way of limitation, spam detection system 160 may stop ticket sales for an event associated with a spam event listing. In another implementation, the spam detection system 160 may flag all event listings created by the event organizer account for manual review.

Figure 5A:
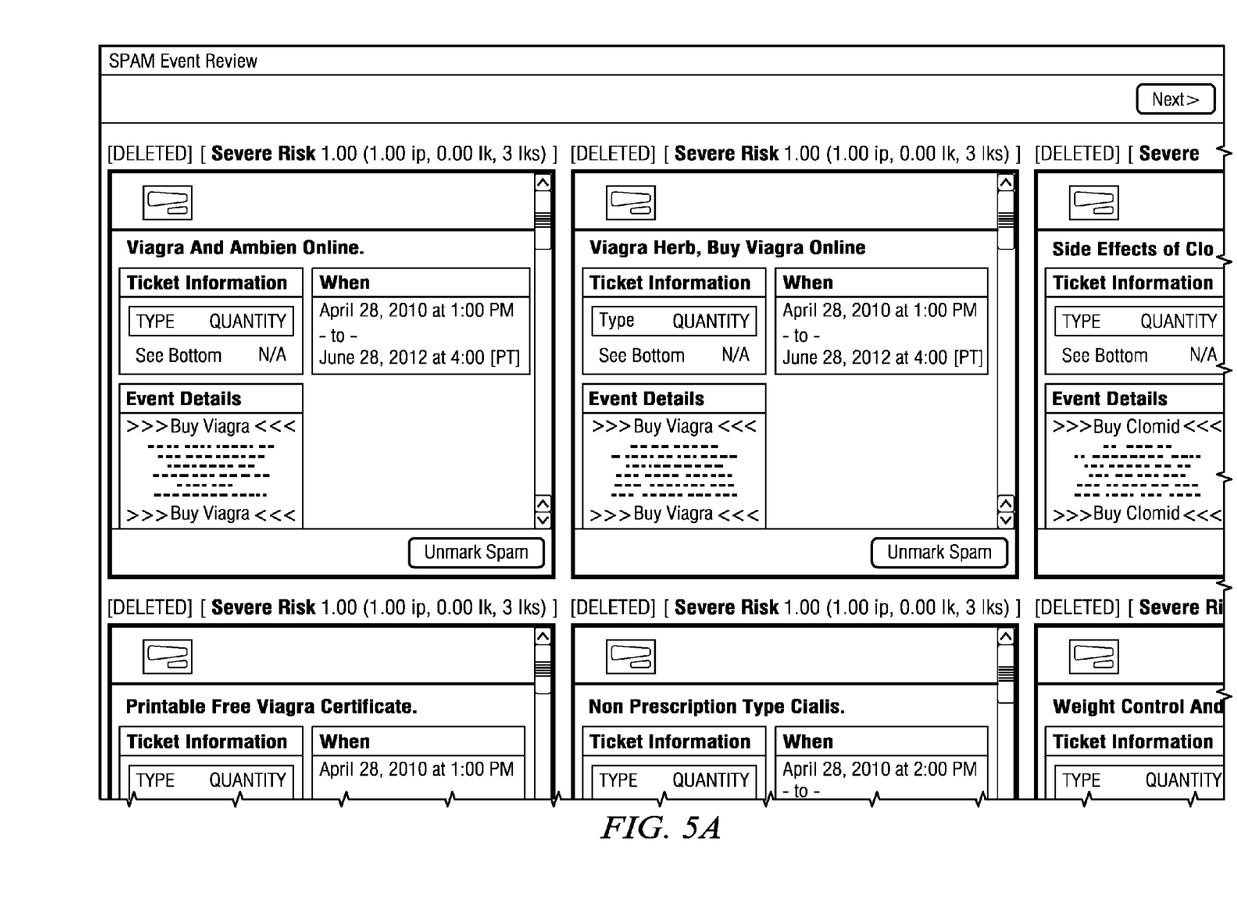

In particular embodiments, spam detection system 160 may display the results of its evaluation of an event listing for spam. As an example and not by way of limitation, spam detection system 160 may calculate a spam risk score for a particular event listing and transmit that score to a client system 130, where it can be viewed by a user. FIGS. 5A and 5B illustrates a system administrator interface that displays event listing pages as thumbnails in association with a spam risk score. From this interface, a system administrator may manually evaluate the event listing and input a final determination. As another example and not by way of limitation, spam detection system 160 may transmit a spam risk score to event management system, where it can be viewed by a system administrator. Although this disclosure describes displaying the evaluation of an event listing for spam on particular systems, this disclosure contemplates displaying the evaluation of an event listing for spam on any suitable system. As an example and not by way of limitation, the calculation of a spam risk score may be displayed on client system 130, spam detection system 160, event management system 170, another suitable system, or two or more such systems.

Systems and Methods

Figure 3:
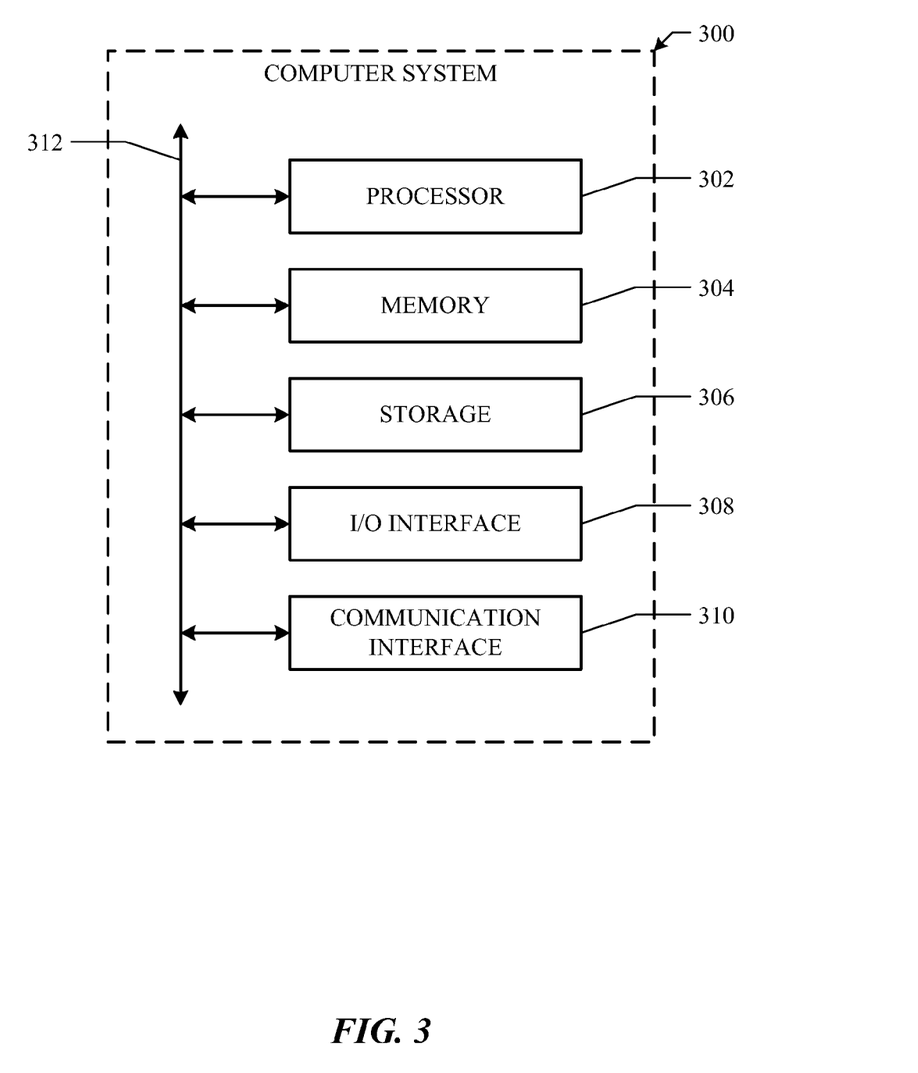
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Figure 4:
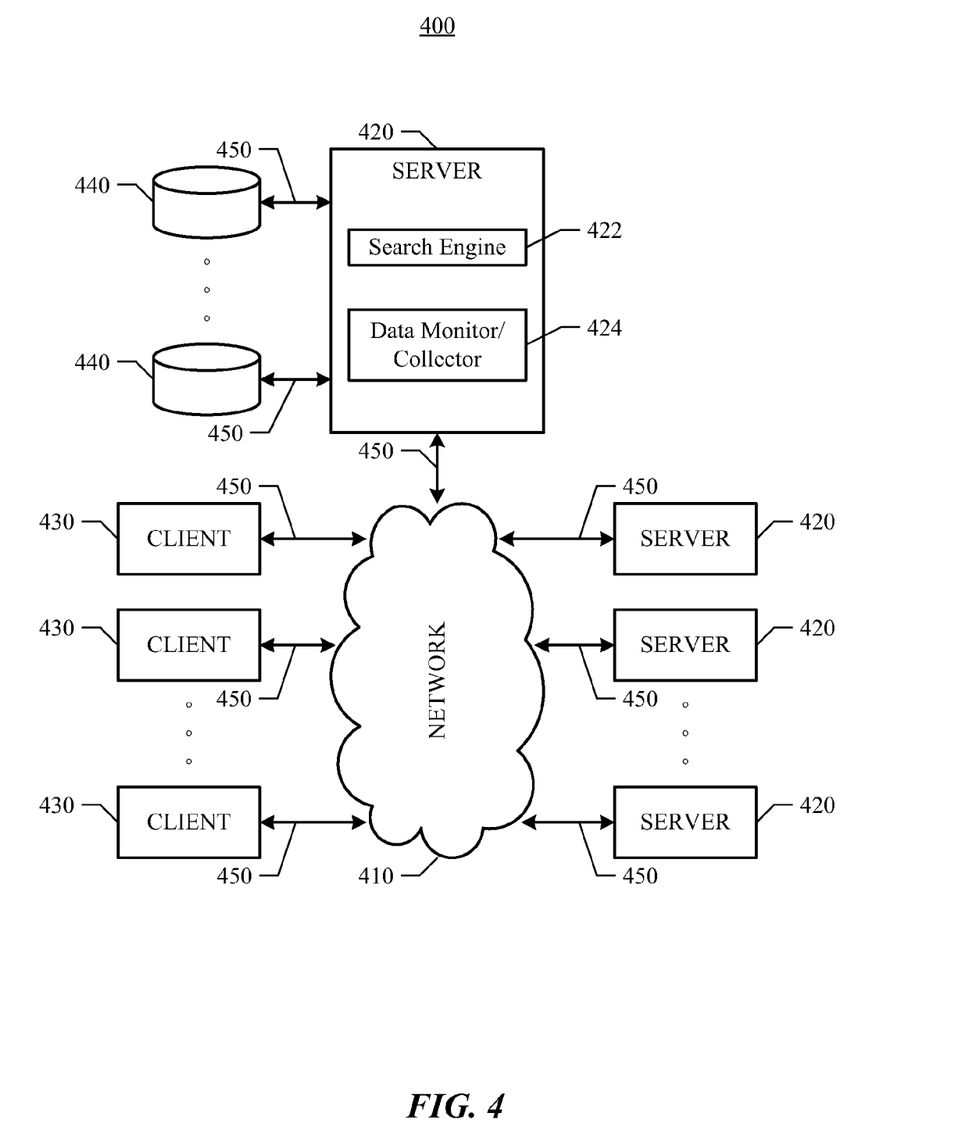
FIG. 4 illustrates an example network environment.

FIG. 4 illustrates an example network environment 400. This disclosure contemplates any suitable network environment 400. As an example and not by way of limitation, although this disclosure describes and illustrates a network environment 400 that implements a client-server model, this disclosure contemplates one or more portions of a network environment 400 being peer-to-peer, where appropriate. Particular embodiments may operate in whole or in part in one or more network environments 400. In particular embodiments, one or more elements of network environment 400 provide functionality described or illustrated herein. Particular embodiments include one or more portions of network environment 400. Network environment 400 includes a network 410 coupling one or more servers 420 and one or more clients 430 to each other. This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 couple servers 420 and clients 430 to network 410 or to each other. This disclosure contemplates any suitable links 450. As an example and not by way of limitation, one or more links 450 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 450. In particular embodiments, one or more links 450 each includes an intranet, an extranet, a VPN, a LAN, a WLAN, a WAN, a MAN, a communications network, a satellite network, a portion of the Internet, or another link 450 or a combination of two or more such links 450. Links 450 need not necessarily be the same throughout network environment 400. One or more first links 450 may differ in one or more respects from one or more second links 450.

This disclosure contemplates any suitable servers 420. As an example and not by way of limitation, one or more servers 420 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 420 includes hardware, software, or both for providing the functionality of server 420. As an example and not by way of limitation, a server 420 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 430, the web server may communicate one or more such files to client 430. As another example, a server 420 that operates as a mail server may be capable of providing e-mail services to one or more clients 430. As another example, a server 420 that operates as a database server may be capable of providing an interface for interacting with one or more data stores (such as, for example, data stores 440 described below). Where appropriate, a server 420 may include one or more servers 420; be unitary or distributed; span multiple locations; span multiple machines; span multiple datacenters; or reside in a cloud, which may include one or more cloud components in one or more networks.

In particular embodiments, one or more links 450 may couple a server 420 to one or more data stores 440. A data store 440 may store any suitable information, and the contents of a data store 440 may be organized in any suitable manner. As an example and not by way or limitation, the contents of a data store 440 may be stored as a dimensional, flat, hierarchical, network, object-oriented, relational, XML, or other suitable database or a combination or two or more of these. A data store 440 (or a server 420 coupled to it) may include a database-management system or other hardware or software for managing the contents of data store 440. The database-management system may perform read and write operations, delete or erase data, perform data deduplication, query or search the contents of data store 440, or provide other access to data store 440.

In particular embodiments, one or more servers 420 may each include one or more search engines 422. A search engine 422 may include hardware, software, or both for providing the functionality of search engine 422. As an example and not by way of limitation, a search engine 422 may implement one or more search algorithms to identify network resources in response to search queries received at search engine 422, one or more ranking algorithms to rank identified network resources, or one or more summarization algorithms to summarize identified network resources. In particular embodiments, a ranking algorithm implemented by a search engine 422 may use a machine-learned ranking formula, which the ranking algorithm may obtain automatically from a set of training data constructed from pairs of search queries and selected Uniform Resource Locators (URLs), where appropriate.

In particular embodiments, one or more servers 420 may each include one or more data monitors/collectors 424. A data monitor/collection 424 may include hardware, software, or both for providing the functionality of data collector/collector 424. As an example and not by way of limitation, a data monitor/collector 424 at a server 420 may monitor and collect network-traffic data at server 420 and store the network-traffic data in one or more data stores 440. In particular embodiments, server 420 or another device may extract pairs of search queries and selected URLs from the network-traffic data, where appropriate.

This disclosure contemplates any suitable clients 430. A client 430 may enable a user at client 430 to access or otherwise communicate with network 410, servers 420, or other clients 430. As an example and not by way of limitation, a client 430 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 430 may be an electronic device including hardware, software, or both for providing the functionality of client 430. As an example and not by way of limitation, a client 430 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 430 may include one or more clients 430; be unitary or distributed; span multiple locations; span multiple machines; span multiple datacenters; or reside in a cloud, which may include one or more cloud components in one or more networks.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    accessing event information associated with a first event listing of an online event management system, wherein the online event management system is operable to register one or more attendees for an event corresponding to the first event listing, and wherein the event is associated with a first event organizer account;
    accessing information identifying one or more remote hosts associated with the first event organizer account, each remote host being external to the online event management system;
    identifying one or more second event organizer accounts based on the one or more identified remote hosts, wherein each of the identified second event organizer accounts is associated with at least one of the remote hosts associated with the first event organizer account; and
    calculating by a spam-detection model a spam risk score for the first event listing based at least in part on a pattern of behavior associated with the first event organizer account and the one or more second event organizer accounts.

2. The method of claim 1 further comprising identifying one or more second event listings created with the one or more second event organizer accounts; and wherein the spam risk score is calculated based further on the one or more second event listings.

3. The method of claim 1 wherein the event information comprises a number of hypertext links in the first event listing.

4. The method of claim 1 wherein the pattern of behavior comprises an observed timing of creation of the first event organizer account and the one or more second event organizer accounts.

5. The method of claim 1 wherein the pattern of behavior comprises an observed timing of creation of the first event organizer account and an event creation rate for the first event organizer account.

6. The method of claim 1 wherein calculating the spam risk score for the first event listing is further based on a geographic location associated with the first event organizer account.

7. The method of claim 1 wherein the information identifying the one or more remote hosts is an Internet Protocol (IP) address.

8. The method of claim 1 wherein the information identifying the one or more remote hosts is a hardware signature.

9. The method of claim 1 further comprising deactivating the first event listing if the calculated spam risk score for the first event listing is greater than a threshold score.

10. The method of claim 9 wherein deactivating the event listing comprises disabling registration for the event.

11. The method of claim 9 wherein deactivating the event listing comprises deleting the event listing.

12. The method of claim 9 wherein deactivating the event listing comprises disabling access to the event listing for users of the online event management system.

13. The method of claim 1 wherein calculating the spam risk score for the first event listing is further based on the event information of the first event listing.

14. The method of claim 1 wherein calculating the spam risk score for the first event listing is further based on the account information of the first event organizer account and the one or more second event organizer accounts.

15. The method of claim 14 wherein the account information of an event organizer account comprises a history of events that the corresponding user has attended or registered to attend.

16. The method of claim 1 wherein the spam risk score represents a probability that the first event listing is spam.

17. The method of claim 1 wherein the spam risk score represents the rank of the risk of spam associated with the first event listing in relation to other event listings.

18. The method of claim 1 further comprising generating the spam-detection model using a regression-based M5P algorithm that is trained by a data set of selected factors, wherein one or more of the factors includes variable thresholds.

19. An apparatus comprising: one or more processors; and a memory coupled to the processors comprising instructions executable by the processors, the processors operable when executing the instructions to:
access event information associated with a first event listing of an online event management system, wherein the online event management system is operable to register one or more attendees for an event corresponding to the first event listing, and wherein the event is associated with a first event organizer account;
access information identifying one or more remote hosts associated with the first event organizer account, each remote host being external to the online event management system;
identify one or more second event organizer accounts based on the one or more identified remote hosts, wherein each of the identified second event organizer accounts is associated with at least one of the remote hosts associated with the first event organizer account; and
calculate by a spam-detection model a spam risk score for the first event listing based at least in part on a pattern of behavior associated with the first event organizer account and the one or more second event organizer accounts.

20. One or more computer-readable non-transitory storage media embodying instructions that are operable when executed to cause one or more processors to:
access event information associated with a first event listing of an online event management system, wherein the online event management system is operable to register one or more attendees for an event corresponding to the first event listing, and wherein the event is associated with a first event organizer account;
access information identifying one or more remote hosts associated with the first event organizer account, each remote host being external to the online event management system;
identify one or more second event organizer accounts based on the one or more identified remote hosts, wherein each of the identified second event organizer accounts is associated with at least one of the remote hosts associated with the first event organizer account; and
calculate by a spam-detection model a spam risk score for the first event listing based at least in part on a pattern of behavior associated with the first event organizer account and the one or more second event organizer accounts.

* * * * *